US008624977B2

(12) United States Patent
Satoh

(10) Patent No.: US 8,624,977 B2
(45) Date of Patent: Jan. 7, 2014

(54) VEHICLE PERIPHERAL IMAGE DISPLAYING SYSTEM

(75) Inventor: Noriyuki Satoh, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 656 days.

(21) Appl. No.: 12/735,912

(22) PCT Filed: Feb. 19, 2009

(86) PCT No.: PCT/JP2009/052879
§ 371 (c)(1),
(2), (4) Date: Sep. 23, 2010

(87) PCT Pub. No.: WO2009/104675
PCT Pub. Date: Aug. 27, 2009

(65) Prior Publication Data
US 2011/0043632 A1 Feb. 24, 2011

(30) Foreign Application Priority Data
Feb. 20, 2008 (JP) ................................. 2008-039395

(51) Int. Cl.
*H04N 7/18* (2006.01)
(52) U.S. Cl.
USPC .......................................................... 348/148
(58) Field of Classification Search
USPC .......................................................... 348/148
See application file for complete search history.

(56) References Cited

U.S. PATENT DOCUMENTS

| 2003/0108222 A1* | 6/2003 | Sato et al. ...................... 382/104 |
| 2007/0147664 A1* | 6/2007 | Kubota et al. ................. 382/106 |
| 2007/0247717 A1* | 10/2007 | Konno et al. ................. 359/613 |
| 2012/0236152 A1* | 9/2012 | De Wind et al. .............. 348/148 |

FOREIGN PATENT DOCUMENTS

| JP | 2002-337605 | 11/2002 |
| JP | 2003-244688 | 8/2003 |
| JP | 2004-350303 | 12/2004 |
| JP | 2005-335410 | 12/2005 |

OTHER PUBLICATIONS

International Search Report.

* cited by examiner

*Primary Examiner* — Phuoc Nguyen
*Assistant Examiner* — Kishin G Belani
(74) *Attorney, Agent, or Firm* — Harness, Dickey & Pierce P.L.C.

(57) ABSTRACT

A vehicle-peripheral image displaying system (a side view monitor system A1) comprises a side camera 1, a monitor 3 and an image processing controlling unit 2, wherein the image processing controlling unit 2 includes an image processor 43 configured to perform a viewpoint conversion of the actually shot camera image input from the side camera 1 into a virtual camera image which is to be converted as if it is viewed from the driver's eye position, an image memory 44 configured to store a vehicle interior image which is previously shot from the driver's eye position as a vehicle interior image, and a superimposing circuit 46 configured to make the vehicle interior image translucent to form a translucent vehicle interior image, to perform an image composition such that the translucent vehicle interior image is superimposed on the virtual camera image, and to produce a composite image which represents the virtual camera image transparently through the translucent vehicle interior image.

10 Claims, 11 Drawing Sheets

VEHICLE PERIPHERAL IMAGE DISPLAYING SYSTEM

TECHNICAL FIELD

The present invention relates to a vehicle-peripheral image displaying system which displays a vehicle-peripheral image including a blind area on a monitor screen of a vehicle interior based on the camera image obtained by a vehicle-mounted external camera.

BACKGROUND ART

Today, a practically used side view monitor system, which has a side camera (CCD camera or the like) provided inside a side mirror, displays an actually shot camera image output from the side camera on a monitor screen of a front display unit which is also used for a navigation system.

That is, a front lateral part of the vehicle, which is blind from a driver, is displayed on the monitor screen so that the driver can recognize a situation of the blind area.

However, since the side camera is provided inside the side mirror, there is a greatly inadequate parallax between a viewing position of the camera and a viewing position of a driver. Shapes of an obstacle or other objects on the camera image and the shapes which can be seen from the driver's seat are totally different.

In response, usually by a habituation of the driver, the driver reconfigures the camera image in his head and judges whilst restructuring a positional relationship between the objects so that consistency with the image which the driver is actually viewing is attained.

On the other hand, in a case of an inexperienced driver or an unexpected case, the consistency between a screen image and the image which can be viewed from the driver's seat is collapsed and an uncomfortable feeling is produced.

In order to eliminate such an uncomfortable feeling, the camera image obtained by the blind area camera which is mounted on a vehicle-exterior is converted into a virtual camera image as if the image is viewed from the driver's eye position so that a converted external image is produced.

Further, out of the camera image obtained by a driver's eye position camera which is provided near the driver's eye position, a visible area image which is excluding the blind area is produced.

And the converted external image is superimposed on the blind area which was excluded from the visible area image so that a composite image is obtained. The vehicle-peripheral image displaying system which obtains the composite image is proposed (for example, see Patent Document 1).

Specifically, a viewpoint conversion of an image of a back camera which is provided on a trunk part of a vehicle exterior is performed as if a rearward of the vehicle is viewed from the driver's eye position.

Here, images are combined. Of the combined rearward view image, a part which is visible from a window is a live image (an actually shot image) output from an interior camera image. And regarding a part which is blind because of a seat or a trunk and cannot be shot by the interior camera, an image is obtained such that an external camera image on which image processing is performed is superimposed.

In this case, since converting the two images into an image which is a completely and smoothly continuous image is technically highly difficult, an effort in order to make a parting line less noticeable is made such that a border line for clipping the image is fitted to a window frame of the vehicle or other thing and an edge portion such as the window frame or the like is superimposed as a superimposed image having a form of thick-frame.

Patent Document 1: Japanese Patent Application Publication No. 2004-350303

DISCLOSURE OF THE INVENTION

Problems to be Solved by the Invention

However, the prior art vehicle-peripheral image displaying system holds the following problems.

(1) The prior art vehicle-peripheral image displaying system needs to include two cameras of the blind area camera and the driver's eye position camera. Since the driver's eye position camera needs to be added on the existing system, a cost of the system is increased.

In addition, the driver's eye position camera is provided near the drive's eye position, that is, the driver's eye position camera cannot be provided exactly at the driver's eye position. Thus, an inadequate parallax against the image which is actually viewed from the driver's viewing position is produced on the camera image obtained from the driver's eye position camera.

(2) Attempts to eliminate the blind area and to eliminate the uncomfortable feeling are made such that mainly two camera images are clipped and combined, the edge portion such as the window frame or the like of the image is emphatically detected, and a superimposing is performed using what is emphatically detected. However, there are limitations and the uncomfortable feeling on the image is still produced.

(3) As described as an example, if the blind camera which has a wide angle on a vertical direction of a depression and elevation angle direction is used, a range of view of the interior camera (the driver's eye position camera) is sufficiently covered. A contribution of the interior camera image for eliminating the blind area is only a part of the view of upside of the trunk or the like. Thus, the interior camera is systematically wasteful.

(4) Despite that the frame on which the superimposing is performed requires an image processing function to be added, the superimposing frame which is made by emphasizing the edge and is used when the camera images are combined does not have enough effects on giving the driver a realization that the driver is viewing the blind area of the vehicle.

In view of solving the above problems, the present invention aims to provide a vehicle-peripheral image displaying system which uses only the vehicle-mounted external camera, is an inexpensive system, can make the blind area from the driver to be intuitively recognized without the inadequate parallax, and can make an external situation, which is the blind area from the driver, to be clearly visible in a relationship with the position of the vehicle.

Solution to Problem

In the present invention, a vehicle-peripheral image displaying system includes a vehicle-mounted external camera which is mounted on a vehicle and shoots an image of a vehicle-periphery, a monitor provided in a vehicle interior at a position to cause the monitor to be visible for a driver, and a monitor-image producing unit which produces an image to be displayed on the monitor based on an actually shot camera image input from the vehicle-mounted external camera, wherein the monitor-image producing unit includes an image processor configured to perform the viewpoint conversion of the actually shot camera image input from the vehicle-mounted external camera into a virtual camera image which is to be converted as if it is viewed from the driver's eye position, an image memory configured to store a vehicle interior image which is previously shot from the driver's eye position as a vehicle interior image, and an image composition circuit configured to make the vehicle interior image output from the image memory translucent to form a translucent vehicle interior image, to perform an image composition such that the translucent vehicle interior image is superimposed on the virtual camera image output from the image processor, and to produce a composite image which represents the virtual camera image transparently through the translucent vehicle interior image.

Advantageous Effects of Invention

Therefore, in the vehicle-peripheral image displaying system of the present invention, the vehicle interior image which is previously shot from the driver's viewing position is stored in the image memory of the monitor-image producing unit.

In the image processor of the monitor-image producing unit, the viewing position conversion of the actually shot camera image input from the vehicle-mounted external camera is performed converting into a virtual camera image which is to be converted as if it is viewed from the driver's eye position.

Then, in the image composition circuit, the vehicle interior image output from the image memory is made translucent so that the translucent vehicle interior image is formed, and the image composition is performed such that the translucent vehicle interior image is superimposed on the virtual camera image output from the image processor, then the composite image which represents the virtual camera image transparently through the translucent vehicle interior image is produced.

As just described, in the image processor, the viewing position conversion of the actually shot camera image input from the vehicle-mounted external camera is performed converting into a virtual camera image which is to be converted as if it is viewed from the driver's eye position so that the driver who looks at the composite image displayed on the monitor can intuitively recognize the blind area, which is included in the virtual camera image, from the driver without the inadequate parallax.

In the image composition circuit, the vehicle interior image which is previously shot from the driver's viewing position is made into the translucent vehicle interior image so that the virtual camera image is represented on the composite image displayed on the monitor transparently through the translucent vehicle interior image, as a result, the external situation, which is blind from the driver and viewed in the virtual camera image, becomes clearly visible in the relationship with the position of the vehicle by the translucent vehicle interior image.

As a result, in addition to achieving the inexpensive system which uses only the vehicle-mounted external camera, the blind area from the driver is intuitively recognized without an inadequate parallax, and the external situation which is blind from the driver becomes clearly visible in the relationship with the position of the vehicle.

DESCRIPTION OF NUMERIC CODES

Figure 1:
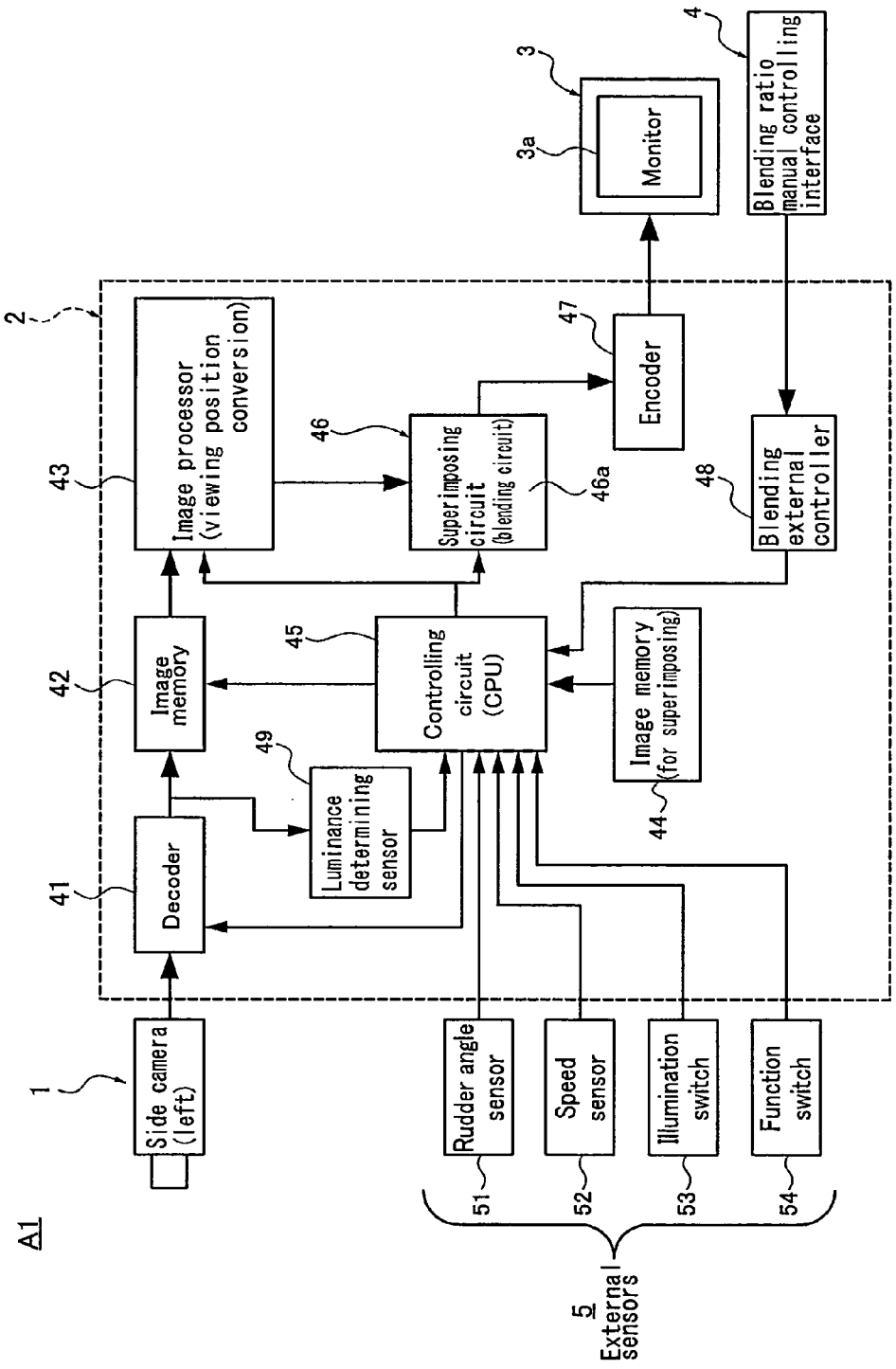
FIG. 1 is an entire system block diagram showing the side view monitor system A1 of the first embodiment (an example of the vehicle-peripheral image displaying system).

A1 side view monitor system (an example of vehicle-peripheral image displaying system)
1 side camera (vehicle-mounted external camera)
A2 back view monitor system (an example of vehicle-peripheral image displaying system)
21 back camera (vehicle-mounted external camera)
A3 front view monitor system (an example of vehicle-peripheral image displaying system)
31L left front camera (vehicle-mounted external camera)
31R right front camera (vehicle-mounted external camera)
31C center front camera (vehicle-mounted external camera)
2 image processing controlling unit (monitor-image producing unit)
41 decoder
41L left decoder
41R right decoder
41C center decoder
42 image memory
42L left image memory
42R right image memory
42C center image memory
43 image processor
44 image memory (image storing memory)
45 controlling circuit (CPU)
46 superimposing circuit (image composition circuit)
47 encoder
48 blending external controller
49 luminance determining sensor (luminance detector)
3 monitor
4 blending ratio manual controlling interface
5 external sensor
51 rudder angle sensor
52 speed sensor
53 illumination switch (lighting condition detector)
54 function switch
55 turning signal switch
RP vehicle interior image
SE area in which dimensions and a form of the vehicle is vertically projected on a road surface
RG translucent vehicle interior image
CE 100% transparent part
GE arbitrary transparent part
DE opaque part

BEST MODE FOR CARRYING OUT THE INVENTION

Hereinafter, as a best mode for realizing a vehicle-peripheral image displaying system according to the present invention, blind area eliminating cameras of three directions will be described in first to third embodiments respectively.

Basically, as represented in FIG. 1, an entire system structure includes a camera for eliminating a blind area, a digital image processor which processes an image of the camera, and a blend-processing section for the translucent images.

When a single camera image is used, the basic structure is in common.

However, regarding a placement and a number of the cameras, the configuration is devised in consideration of a cost and the like.

Further, transparency of a translucent part on a monitor is displayed with a transmissivity which is initially set (an initial transmissivity value). However, the system is assumed to be such that the transmissivity is not fixed and can be arbitrarily changed in a range of the transmissivity from 0 to 100% by a user (=a driver).

Also, the system is assumed to be such that the transmissivity of each area is customizable according to the user's desire.

FIRST EMBODIMENT

A first embodiment is an example of a side view monitor system. The side view monitor system displays on a vehicle interior monitor a front lateral part, which is a blind area from the driver, of the vehicle by using a side camera which is provided inside or near a side mirror and is for eliminating the blind area as a vehicle-mounted external camera.

First, the structure thereof will be described.

FIG. 1 is an entire system block diagram showing the side view monitor system A1 of the first embodiment (an example of the vehicle-peripheral image displaying system).

The side view monitor system A1 of the first embodiment, as shown in FIG. 1, includes the side camera 1 (the vehicle-mounted external camera), an image processing controlling unit 2 (monitor-image producing unit), the monitor 3, a blending ratio manual controlling interface 4, and an external sensor 5.

The side camera 1 is provided inside or near a left side mirror to be mounted and shoots an image of the front lateral part, which is a blind area from the driver, of the vehicle.

The side camera 1 obtains data of an actually shot camera image of the front lateral part of the vehicle by an image sensor (CCD, CMOS or the like).

The monitor 3 is provided in the vehicle interior at a position to cause the monitor to be visible for the driver (for example, at a position of an instrument panel or the like). An image is output from the image processing controlling unit 2 to be displayed, and the image is input to be displayed on the monitor 3. The monitor 3 includes a display screen 3a made with a liquid crystal display, an organic EL or the like.

Here, as the monitor 3, a dedicated monitor may be provided in the side view monitor system A1 or a dedicated monitor may also be provided in a camera system for eliminating the blind area, and also, a monitor for the other system such as a navigation system or the like may be appropriated.

The image processing controlling unit 2 produces an image to be displayed on the monitor 3 based on the actually shot camera image input from the side camera 1.

The image processing controlling unit 2, as shown in FIG. 1, includes a decoder 41, an image memory 42, an image processor 43, an image memory 44 (an image storing memory), a controlling circuit (CPU) 45, a superimposing circuit 46 (an image composition circuit), an encoder 47, a blending external controller 48, and a luminance determining sensor 49 (a luminance detector).

The image processor 43 performs the viewpoint conversion of the actually shot camera image input from the side camera 1 converting into a virtual camera image which is to be viewed from a driver's eye position.

Specifically, an analog/digital conversion of the actually shot camera image input from the side camera 1 is performed by the decoder 41 and the actually shot camera image is stored in the image memory 42.

Then, in the image processor 43, "image processing including various processing (a luminance adjustment, a color correction, an edge correction or the like)" and "viewpoint conversion processing as if the virtual camera is provided at the driver's eye position" are made.

The image memory 44 stores a vehicle interior image RP (FIG. 3), which is previously shot from the driver's eye position, as a vehicle interior image.

The superimposing circuit 46 makes the vehicle interior image RP output from the image memory 44 translucent to form a translucent vehicle interior image RG (FIG. 7), and performs an image composition such that the translucent vehicle interior image RG is superimposed on the virtual camera image output from the image processor 43, then produces a composite image representing the virtual camera image transparently through the translucent vehicle interior image RG.

The superimposing circuit 46 displays, of the vehicle interior image RP which is previously shot from the driver's eye position, an area SE (FIG. 4) in which dimensions and a form of the vehicle is vertically projected on a road surface as a shadow.

Figure 7:
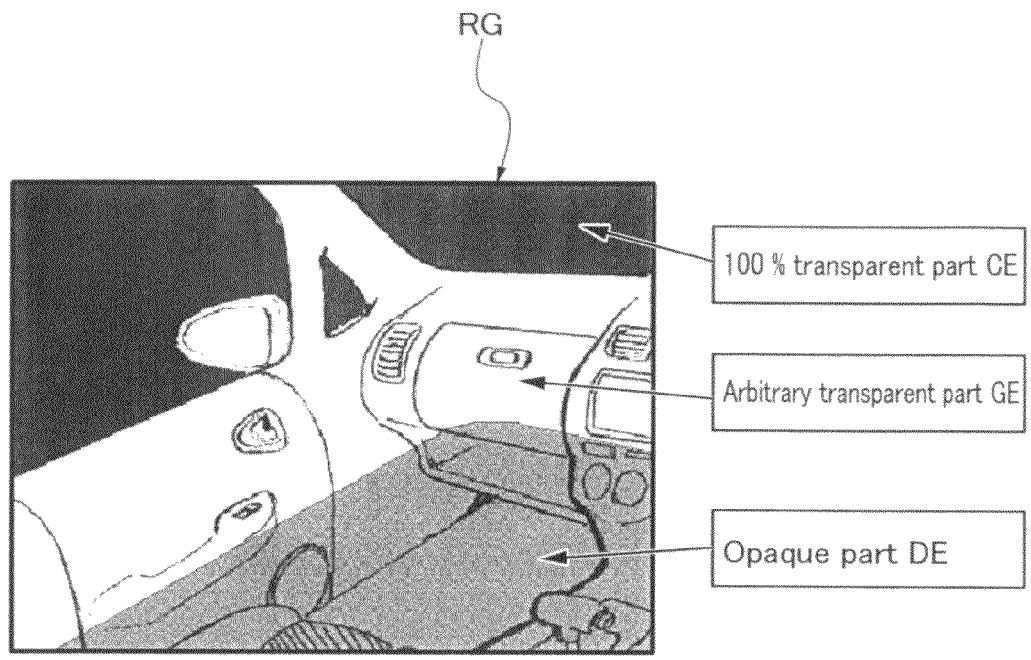
FIG. 7 shows the translucent vehicle interior image RG which is obtained by combining in the side view monitor system A1 of the first embodiment "the opaque part DE", "the 100% transparent part CE" and "the arbitrary transparent part GE" with the vehicle interior image RP of FIG. 3.

Specifically, the superimposing circuit 46 includes a blending circuit 46*a* configured to set, of the vehicle interior image RP, the shadow area SE in which the vehicle is projected on the road surface as "an opaque part DE" having a transmissivity of 0% of the vehicle interior image, an area corresponding to a window glass of the vehicle as "a 100% transparent part CE" having a transmissivity of 100% of the vehicle interior image, and an area other than the shadow and the window glass as "an arbitrary translucent part GE" having an arbitrary transmissivity (FIG. 7).

Figure 8:
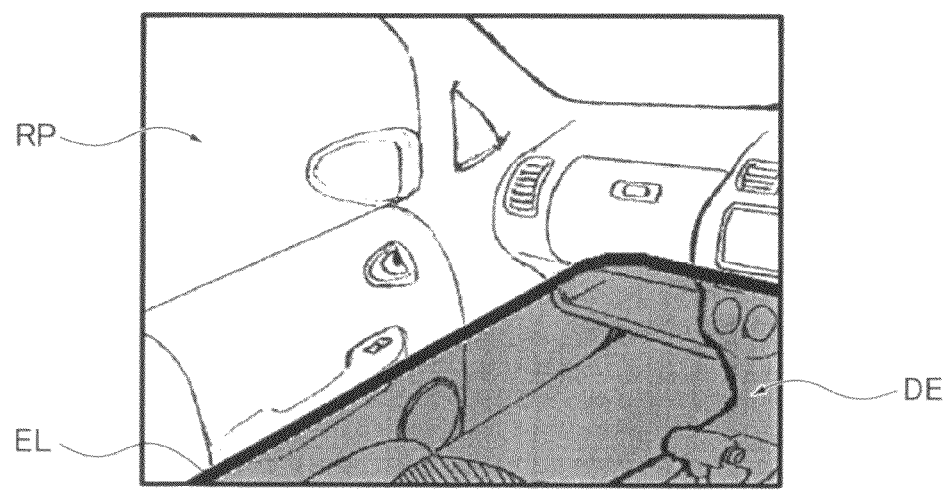
FIG. 8 shows an image in which the border frame EL is displayed on an outer circumference of the area set as "the opaque part DE" having the transmissivity of 0% of the vehicle interior image RP shown in FIG. 3 in the side view monitor system A1 of the first embodiment.

Further, the blending circuit 46*a* may set a border frame EL to be displayed on an outer circumference of the area set as "the opaque part DE" having the transmissivity of 0% of the vehicle interior image RP (FIG. 8).

Then, in the superimposing circuit 46, the composite image made by a superimposing technique, which combines the translucent vehicle interior image RG and the virtual camera image, is transmitted to the encoder 47 and is processed by using digital/analog conversion in the encoder 47, then is output to the monitor 3 and displayed on the display screen 3*a*.

The blending ratio manual controlling interface 4, for example, may be composed of a touch panel switch of the monitor 3 and arbitrarily adjusts the transmissivity of "arbitrary translucent part GE" set on the vehicle interior image by a manual operation (a blending ratio manual adjuster).

That is to say, once a transmissivity adjusting signal is input from the blending ratio manual controlling interface 4 to the blending external controller 48, the signal passes over the controlling circuit 45, and according to a transmissivity setting command from the controlling circuit 45, the blending circuit 46*a* arbitrarily adjusts the transmissivity of "arbitrary translucent part GE" set on the vehicle interior image in a range of 0% to 100%.

The external sensor 5 is a sensor, a switch or the like, which brings information to be input to the image processing controlling unit 2. As shown in FIG. 1, the external sensor 5 includes a rudder angle sensor 51, a speed sensor 52, an illumination switch 53 (a lighting condition detector), a function switch 54, and the other sensor, switch or the like.

When the function switch 54 is ON, based on vehicle information (a rudder angle, a vehicle speed or the like) and external environmental information obtained by the external sensor 5 (daytime, early-evening, nighttime, weather or the like), the blending circuit 46*a* automatically adjusts the transmissivity of "arbitrary translucent part GE" set on the vehicle interior image so that enhanced visibility of the composite image to be displayed on the monitor 3 is achieved (a blending ratio sensor conjunction adjuster).

Further, the illumination switch 53 as a lighting condition detector which detects lighting/light-out of an illumination lamp in the vehicle interior and the luminance determining sensor 49 which detects a luminance of the actually shot camera image input from the side camera 1 are provided.

When both of conditions where the illumination lamp is lighting and where a detected luminance value is lower than a set value Y are met, the superimposing circuit 46 inverts the luminance of the composite image along with displaying a line with a white line instead of a black line.

Figure 2:
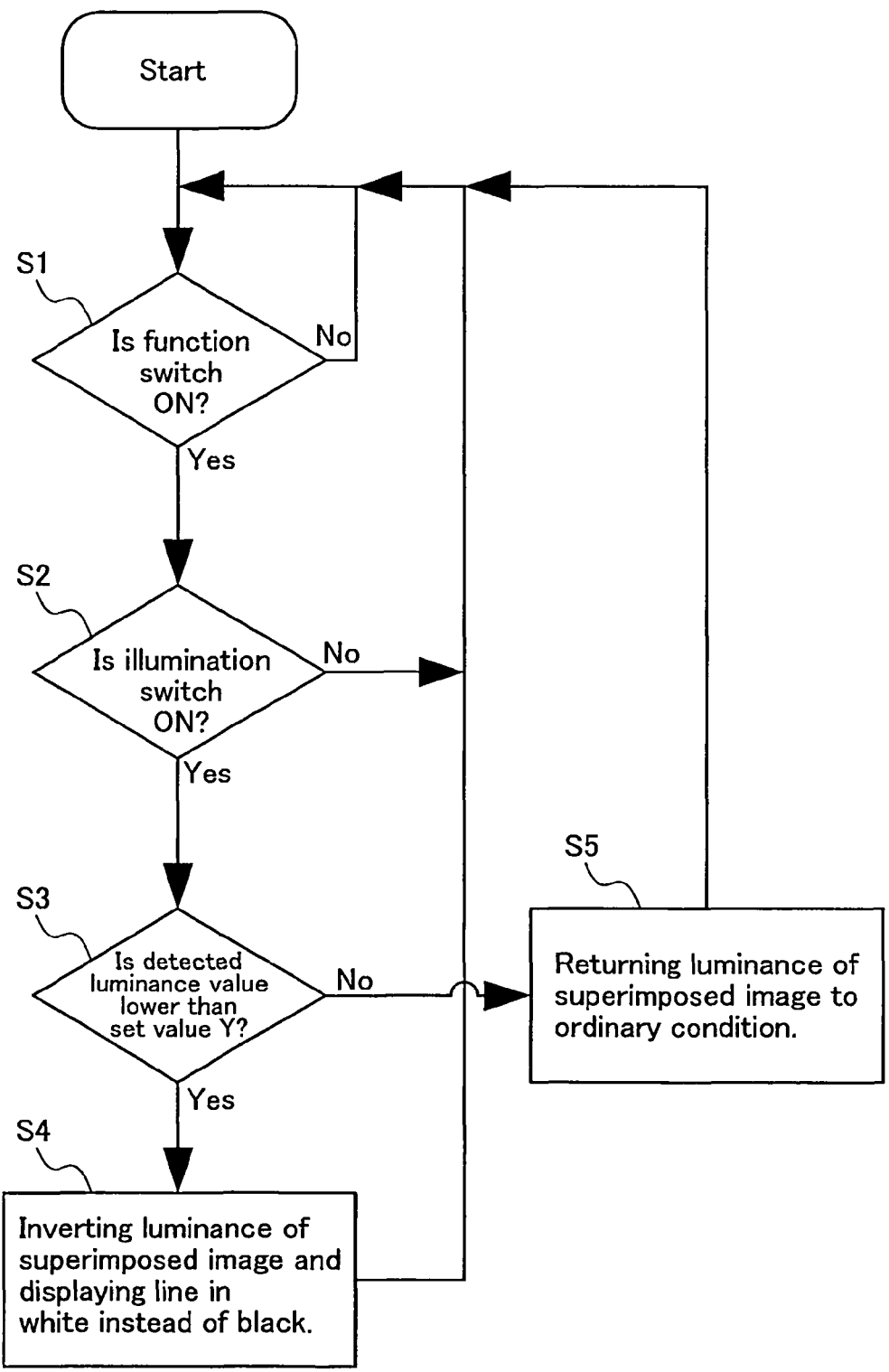
FIG. 2 is a flow chart showing a flow of composite image luminance controlling processing performed at the controlling circuit 45 in the side view monitor system A1 of the first embodiment.

FIG. 2 is a flow chart showing a flow of composite image luminance controlling processing performed at the controlling circuit 45 in the side view monitor system A1 of the first embodiment, and hereinafter, each step will be described (a composite image luminance controller).

At a step S1, whether the function switch 54 is ON or not is judged, and if Yes, the process moves on to a step S2, and if No, returns to the judgment of the step S1.

At the step S2, following the judgment at the step S1 in which the function switch 54 is ON, whether the illumination switch 53 is ON is judged, that is, whether the illumination lamp is ON or not, and if Yes, the process moves on to a step S3, and if No, returns to the judgment of the step S1.

At the step S3, following the judgment at the step S2 in which the illumination switch 53 is ON, whether the detected luminance value detected by the luminance determining sensor 49 is lower than the set value Y or not is judged, and if Yes, the process moves on to a step S4, and if No, moves on to a step S5.

At the step S4, following the judgment at the step S3 in which the detected luminance value is lower than the set value Y, the luminance of the superimposed image is inverted along with displaying the line in the white line instead of the black line and the process is returned to the step S1.

At the step S5, following the judgment at the step S3 in which the detected luminance value is equal or larger than the set value Y, the luminance of the superimposed image is returned to an ordinary condition and the process is returned to the step S1.

Next, a function is described.

The purpose of the present invention including the first to the third embodiment is to propose the vehicle-peripheral image displaying system. The vehicle-peripheral image displaying system includes the external camera which is capable of contributing to eliminate the blind area. Also the purpose is to inexpensively propose, of systems each capable of displaying a camera image by using image processing, a system in which the driver is capable of intuitively recognizing the camera image as if the image is viewed transparently through the vehicle only by taking a glance at the image. Further the purpose is to propose the vehicle-peripheral image displaying system in which a move of the vehicle is capable of being recognized in the image.

The main subject matter of the displaying system proposed by the present inventor is as follows.

To achieve a displaying method in which a moving direction, dimensions and the other senses of the vehicle are intuitively recognized by a glance at the image displayed on the monitor.

To achieve a displaying system in which the transmissivity and the like of the image is freely changed according to the driver's taste, and in which the basic transmissivity is capable of being automatically changed corresponding to the driving situation.

For example, at nightfall or the like, the external image is made more visible by changing the transmissivity corresponding to the luminance of the external image.

Further, at nighttime or the like, ingenious efforts, in that the luminance inversion is made on a part of the image which is the part being superimposed with the external image to display the white line instead of the black line in order to make the camera image, on which the viewpoint conversion is performed, more visible, are made.

Hereinafter, the function of the side view monitor system A1 of the first embodiment will be described under "Monitor-Image Displaying Function by Transparent Image", "Translucent Part Transmissivity Changing Function", and "Composite Image Luminance Controlling Function".

[Monitor-Image Displaying Function by Transparent Image]

The analog/digital conversion of the actually shot image input from the side camera 1 is performed by the decoder 41 and the image is stored in the image memory 42.

Then, in the image processor 43, "the image processing including various processing (the luminance adjustment, the color correction, the edge correction or the like)" and "the viewpoint conversion processing as if the virtual camera is provided at the driver's eye position" are made, and the virtual camera image is obtained.

On the other hand, the image memory 44 stores the vehicle interior image RP (FIG. 3) which is previously shot from the driver's eye position as the vehicle interior image.

Then, the superimposing circuit 46 makes the vehicle interior image RP output from the image memory 44 translucent to form the translucent vehicle interior image RG (FIG. 7), and performs the image composition such that the translucent vehicle interior image RG is superimposed on the virtual camera image output from the image processor 43, then produces the composite image which represents the virtual camera image transparently through the translucent vehicle interior image RG.

The composite image, which is superimposed in the superimposing circuit 46, is transmitted to the encoder 47, and is processed by performing the digital/analog conversion, then is output to the monitor 3 and displayed on the display screen 3a.

Hereinafter, ingenious efforts for producing the translucent vehicle interior image RG are described.

Figure 3:
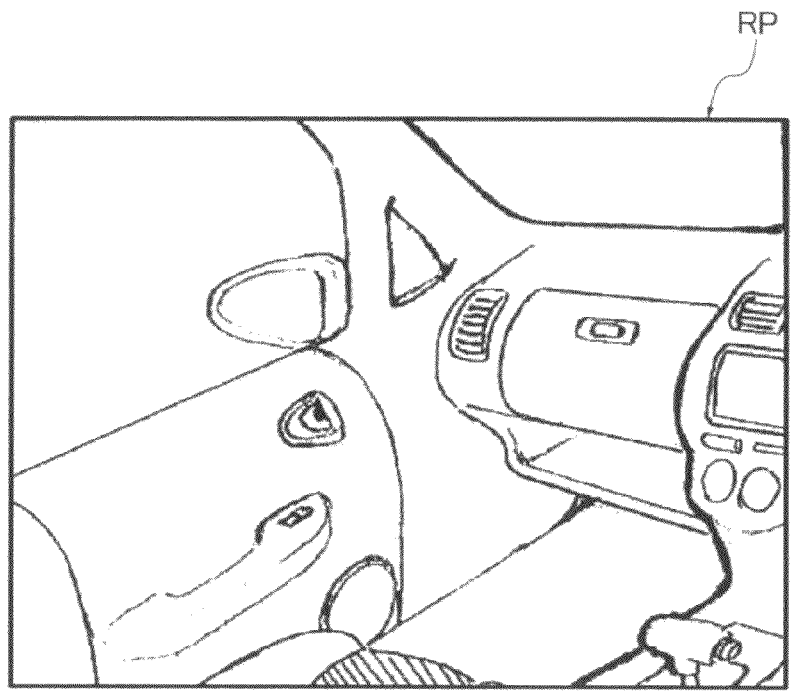
FIG. 3 shows a vehicle interior image which is previously shot from the driver's eye position toward the left front lateral side.

FIG. 3 shows a vehicle interior image which is previously shot from the driver's eye position toward the left front lateral side.

Figure 4:
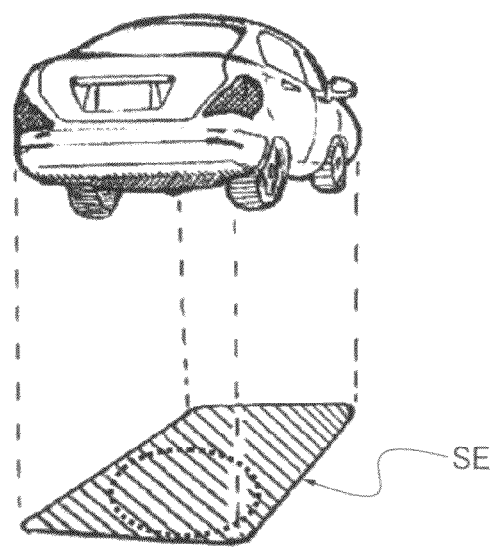
FIG. 4 is an oblique perspective view showing a state where the form of the vehicle is projected on the road surface from the vehicle on which the side view monitor system A1 of the first embodiment is mounted.

FIG. 4 is an oblique perspective view showing a state where the form of the vehicle is projected on the road surface from the vehicle on which the side view monitor system A1 of the first embodiment is mounted.

Figure 5:
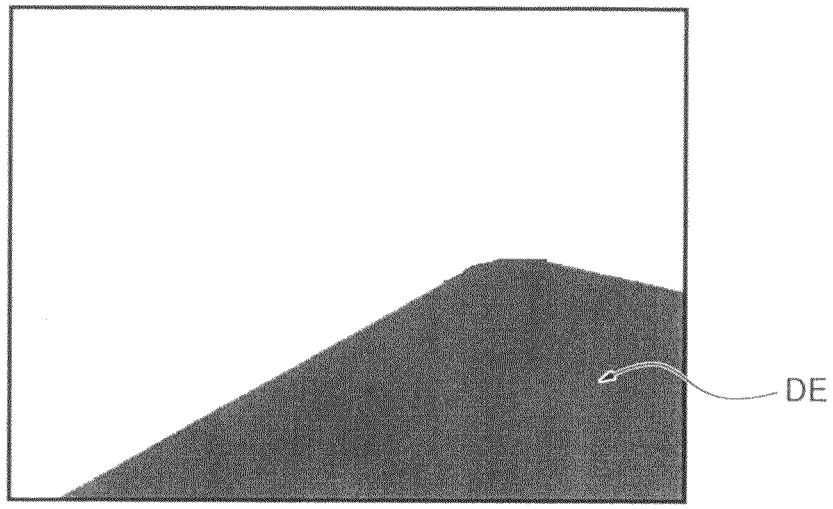
FIG. 5 shows an image (the opaque part) which is the form of the vehicle projected on the road surface from the vehicle on which the side view monitor system A1 of the first embodiment is mounted.

FIG. 5 shows an image (the opaque part) which is the form of the vehicle projected on the road surface from the vehicle on which the side view monitor system A1 of the first embodiment is mounted, and which is viewed through from the driver's eye position.

Figure 6:
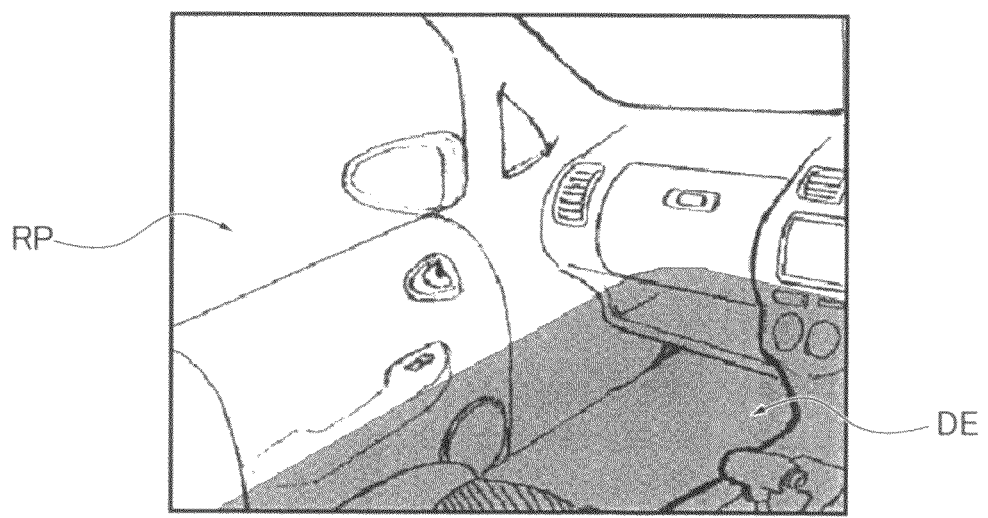
FIG. 6 shows the composite image which is obtained by combining in the side view monitor system A1 of the first embodiment "the opaque part DE" of FIG. 5 with the vehicle interior image RP of FIG. 3.

FIG. 6 shows the composite image which is obtained by combining in the side view monitor system A1 of the first embodiment "the opaque part DE" of FIG. 5 with the vehicle interior image RP of FIG. 3.

FIG. 7 shows the translucent vehicle interior image RG which is obtained by combining in the side view monitor system A1 of the first embodiment "the opaque part DE", "the 100% transparent part CE" and "the arbitrary transparent part GE" with the vehicle interior image RP of FIG. 3.

On the displayed vehicle interior image RP as shown in FIG. 3, ingenious efforts as follows are made.

In FIG. 4, the vehicle is illustrated at a high position in the air so that it is discernible. However in fact, the form of the vehicle is vertically projected on the surface of the road or the like as a projection surface and the projected image is positioned at the same height position as a contact area of tires.

The image shown in FIG. 5 shows the vehicle form itself at an actual driving. Therefore, when the image shown in FIG. 5 is superimposed on the image viewed from the driver's eye position, to touch the projected image is to touch the vehicle body.

In other words, by superimposing a viewpoint conversion image and the projection surface and displaying the superimposed image, the vehicle sense which is needed at an avoidance of the obstacle or a wheel falling into a side ditch can be obtained at a glance and intuitive recognition can be achieved only by the driver taking a glance at the image (the side view image) so that a contributory level to a safe driving becomes larger.

That is, as shown in FIG. 6, the part on which the vehicle form is projected is displayed as "the opaque part DE" having the transmissivity of 0%, and the vehicle interior image RP is displayed as it is.

On the area which does not overlap with the projected vehicle body image, the vehicle interior image RP is displayed with an arbitrary transmissivity by using an a (alpha) blend with the side camera image.

Specifically, as shown in FIG. 7, the window glass part is displayed as "the 100% transparent part CE" having the transmissivity of 100% and the other part is displayed as "the arbitrary translucent part GE" having an arbitrary transmissivity, then once "the opaque part DE" having the transmissivity of 0% is added, the vehicle interior image RP viewed from the driver's eye position is 100% displayed.

When the translucent vehicle interior image RG which is actually effected is checked, a floor surface, that is, the vehicle interior image RP which is not modified appears clearly different from a vicinity of the door having the transmissivity of 10 to 50% so that the vehicle form is easily distinguished.

Further, when the virtual camera image is overlapped with the actually effected translucent vehicle interior image RG, because of a superimposing method using the vehicle interior image, it is extremely straightforward to recognize that the side camera image after performing the viewpoint conversion (=the virtual camera image) is the image which is obtained by transparently viewing through the door.

As described above, by the image processing of the viewpoint conversion, the actually shot camera image of the side camera 1 provided on the side mirror is processed to be converted from the actual image into the virtual camera image as if it is shot by the virtual camera from the driver's eye position. The virtual camera and the vehicle interior image which is made translucent are combined to form the composite image to be displayed while superimposing so that the transparent image having a more improved sense of reality can be expressed.

In addition, by displaying the shadow, in which the actual dimensions and the form of the vehicle are vertically projected on the road surface, on the vehicle interior image which is made translucent, a positional relationship between the external transparent image and the actual vehicle can be displayed to be clearly recognized.

Furthermore, of the vehicle interior image RP of the driver's eye position, the shadow area, in which the dimensions and the form of the vehicle are projected on the road which is a virtual space screen when the above-described viewpoint conversion is made, is displayed as "the opaque part DE" having the transmissivity of 0%, and the other part is displayed as the translucent area ("the 100% transparent part CE", "the arbitrary transparent part GE") having the arbitrary transmissivity.

Therefore, the screen image is displayed as a superimposed image having the dimensions and the form of the vehicle clearly displayed, and the other part becomes a picture image blended with the camera image.

As a result, the move of the vehicle becomes quite obvious at a glance and the possibility of a wheel coming off or the like is easily judged.

The conventional system has required not only the external back camera but also an interior camera and a substantive advantage is rarely achieved considering the increased cost. It has been a redundant system.

In contrast, in the present proposal, regarding the vehicle interior image, sufficient effects of required effects are achieved by using the image of the vehicle interior image RP which is previously shot from the driver's eye position, that is, the virtual camera viewing position. Also, because the form of the vehicle is recognized at a glance, it is extremely straightforward to see the traveling direction or to avoid the obstacle coming close by. Thus, it can contribute to a safe driving.

FIG. 8 shows an image in which the border frame EL is displayed on an outer circumference of the area set as "the opaque part DE" having the transmissivity of 0% of the vehicle interior image RP shown in FIG. 3 in the side view monitor system A1 of the first embodiment.

Of expressions of the translucent vehicle interior image RG, the distinction of the superimposed images can be made not only by the blending ratio which differentiates the transmissivity, as shown in FIG. 7, but also, as shown in FIG. 8, by having the projected image of the vehicle set as "the opaque part DE" which has the transmissivity of 0%, and by displaying the border frame EL on the outer circumference of the area "the opaque part DE" to express and superimposing "the opaque part DE" on the vehicle interior image RP to express. The same effects as the distinction by the blending ratio can be obtained.

[Translucent Part Transmissivity Changing Function]

As described above, the blending circuit 46a of the superimposing circuit 46, of the vehicle interior image RP, sets the shadow area SE in which the form of the vehicle is vertically projected on the road surface as "the opaque part DE" having the transmissivity of 0% of the vehicle interior image, sets the area corresponding to the window glass of the vehicle as "the 100% transparent part CE" having the transmissivity of 100% of the vehicle interior image, and sets the area other than the shadow and the window glass as "the arbitrary translucent part GE" having the arbitrary transmissivity (FIG. 7).

As just described, because not by applying an uniform translucent image, but by blending and combining the images which have various transmissivities and the blendable translucent area of 100% and 100 to 0%, all kinds of misinterpretations or cognition errors caused by an uniform screen image can be eliminated.

However, regarding "the arbitrary transparent part GE", if a previously set single fixed transmissivity is used, the user cannot arbitrarily change the transmissivity so that a poor usability may be caused. Also if the transmissivity of the screen image is uniform even when there are environmental changes, a decreased visibility may be caused.

In response, in the first embodiment, the transmissivity of "the arbitrary transparent part GE" is capable of being adjusted automatically or by the manual operation.

That is to say, once a transmissivity adjusting signal is input by the manual operation on the blending ratio manual controlling interface 4 to the blending external controller 48, the signal passing over the controlling circuit 45, according to the transmissivity setting command from the controlling circuit 45, the blending circuit 46a arbitrarily adjusts the transmissivity of "the arbitrary translucent part GE" set on the vehicle interior image in a range of 0% to 100%.

Further, when the function switch 54 is ON, the blending circuit 46a automatically adjusts the transmissivity of "the arbitrary translucent part GE" set on the vehicle interior image based on vehicle information (rudder angle, vehicle speed or the like) and external environmental information (daytime, early-evening, nighttime, weather or the like) obtained by the external sensor 5 so as to enhance the visibility of the composite image displayed on the monitor 3.

Therefore, the blending ratio is capable of being changed by the manual operation, so that the transmissivity of "the arbitrary transparent part GE" is capable of being freely set and updated. As a result, a system which is highly user-friendly is achieved.

Also, when the function switch 54 is ON, the system in which the transmissivity of "the arbitrary transparent part GE" is automatically adjusted without an operation by the user is achieved so that the enhanced visibility of the composite image displayed on the monitor 3 can be maintained.

[Composite Image Luminance Controlling Function]

The ON signal from the illumination switch 53 is detected when the outside sight is unclear such as nighttime, early-evening, and bad weather.

Therefore, while the illumination lamp is lighting, the entire luminance of the display screen 3a of the monitor 3 turns down, and the vehicle interior image may disappear in the darkness on the usual superimposed screen image.

Also, eyesight of the driver responds to the darkness, therefore the luminance of the entire screen image needs to be lowered.

In this system, when the function switch 54 is ON and when both of conditions where the illumination lamp is lighting and where the detected luminance value is lower than the set value Y are met, in the flow chart of FIG. 2, the process moves onto step S1, step S2, step S3, and to step S4. At the step S4, the luminance of the composite image is inverted along with displaying the line with the white line instead of the black line.

Once the detected luminance value becomes larger than the set value Y, in the flow chart of FIG. 2, the process moves onto step S1, step S2, step S3, and step S5. At the step S5, the luminance of the composite image is turned back to the normal condition.

That is, in the controlling circuit 45, the brightness of the screen is automatically corrected to be the most appropriate level based on the information from the luminance determining sensor 49. At this time, based on the ON signal from the illumination switch 53 and the set value Y of the luminance signal which is previously set, the luminance inversion of the superimposed vehicle interior image is performed so that the line, which has been expressed with the black line, is displayed with the white line instead of the black line, and the inverted image is superimposed.

As just described, by displaying the inverted image, the display screen of the monitor 3 made by superimposing becomes an image close to a line drawing of white line so that the vehicle sense can be intuitively recognized even in the dark external camera image.

Next, the advantageous effects will be described.

In the side view monitor system A1 of the first embodiment, the advantageous effects described as follows are achieved.

(1) In the vehicle-peripheral image displaying system (the side view monitor system A1) including the vehicle-mounted external camera (the side camera 1) mounted on the vehicle and configured to shoot an image of the vehicle-periphery, the monitor 3 provided in the vehicle interior at the position to cause the monitor to be visible for the driver, and the monitor-image producing unit (the image processing controlling unit 2) configured to produce an image to be displayed on the monitor 3 based on the actually shot camera image input from the vehicle-mounted external camera, the monitor-image producing unit includes the image processor 43 configured to performs the viewpoint conversion of the actually shot camera image input from the vehicle-mounted external camera into the virtual camera image which is to be viewed from the driver's eye position, the image memory (the image memory 44) configured to store the shot image of the vehicle-interior which is previously shot from the driver's eye position as the vehicle interior image, and the image composition circuit (the superimposing circuit 46) which makes the vehicle interior image output from the image memory translucent to form a translucent vehicle interior image, performs an image composition such that the translucent vehicle interior image is superimposed on the virtual camera image output from the image processor, and produces a composite image representing the virtual camera image transparently through the translucent vehicle interior image.

Therefore, in addition to achieving the inexpensive system which uses only the vehicle-mounted external camera, the blind area from the driver is intuitively recognized without a disparity, and the external situation of the blind area from the driver is clearly visible in the relationship with the position of the vehicle.

(2) The image composition circuit (the superimposing circuit 46), of the entire area of the vehicle interior image which is previously shot from the driver's eye position, displays the area in which the dimensions and the form of the vehicle are vertically projected on the road surface as the shadow.

Therefore, a positional relationship, a distant relationship and shifts of the position and the distance between the shadow, which represents the vehicle, and the obstacle or the like, which exists within the external area being blind from the driver, can be clearly recognized, and as a result, a slow driving or a parking can be done with an enhanced safety.

(3) The image composition circuit (the superimposing circuit 46) includes the blending circuit 46a configured to set, of the vehicle interior image RP, the shadow area SE in which the vehicle is projected on the road surface as "the opaque part DE" having the transmissivity of 0% of the vehicle interior image RP, set the area corresponding to a window glass of the vehicle as "the 100% transparent part CE" having the transmissivity of 100% of the vehicle interior image, and set the area other than the shadow and the window glass as "the arbitrary translucent part GE" having the arbitrary transmissivity.

Therefore, the superimposed screen image having the clear dimensions and the form of the vehicle is displayed on the monitor 3. For example, the various misinterpretations or the cognition errors which occur if the screen image is displayed with a uniform translucent image can be eliminated. As a result, the move of the vehicle becomes quite obvious at a glance and the judgment for avoiding the wheel coming off or the like can be made easier.

(4) The blending circuit 46a set the border frame EL to be display on the outer circumference of "the opaque part DE" having the transmissivity of 0% of the vehicle interior image.

Therefore, by a simple technique which does not differentiate the blending ratio of the transmissivity, the positional relationship, the distant relationship and shifts of the position and the distance between the shadow, which represents the vehicle, and the obstacle or the like, which exists within the external area being blind from the driver, can be clearly recognized.

(5) The blending circuit 46a includes the blending ratio manual adjuster (the blending ratio manual controlling interface 4, the blending external controller 48, and the controlling circuit 45) which arbitrarily adjusts by the manual operation the transmissivity of the translucent part set on the vehicle interior image ("the arbitrary transparent part GE").

Therefore, the system having an improved usability can be achieved such that the transmissivity of the translucent part is adjusted by the manual operation according to the user's taste or the visibility of the image displayed on the monitor 3.

(6) The blending circuit 46a includes the blending ratio sensor conjunction adjuster (the controlling circuit 45) which automatically adjusts the transmissivity of the translucent part set on the vehicle interior image ("the arbitrary transparent part GE") based on the vehicle information and the external environmental information obtained by the external sensor 5 so that the enhanced visibility of the composite image displayed on the monitor 3 is obtained.

Therefore, without requiring an operation by the user, the system which maintains the enhanced visibility of the composite image displayed on the monitor 3 is achieved by an adjusting performance which is automatically performed.

(7) The lighting condition detector (the illumination switch 53) which detects lighting/light-out of the illumination lamp in the vehicle interior and the luminance detector (the luminance determining sensor 49) which detects the luminance of the actually shot camera image input from the vehicle-mounted external camera are provided. The image composition circuit (the superimposing circuit 46) includes a composite image luminance controller (FIG. 2) which inverts the luminance of the composite image along with displaying the line with the white line instead of the black line when both of conditions where the illumination lamp is lighting and where a detected luminance value is lower than the set value are met.

Therefore, when the outside sight is unclear such as nighttime, early-evening, and bad weather, the vehicle sense can be intuitively recognized even in the dark external camera image.

(8) The vehicle-mounted external camera is the side camera 1 used for the side view monitoring system A1 configured to display the front lateral part, which is the blind area from the driver, of the vehicle on the vehicle interior monitor 3.

Therefore, the vehicle sense which is needed when avoiding the obstacle or avoiding the wheel falling into the side ditch are achieved at a glance and can be intuitively recognized so that the contributory level to a safe driving can be made larger.

SECOND EMBODIMENT

The second embodiment is an example of a back view monitor system configured to display a back part, which is the blind area from the driver, of the vehicle on the vehicle interior monitor by using a back camera provided at the back position of the vehicle as the vehicle-mounted external camera for eliminating the blind area.

First, the structure is described.

Figure 9:
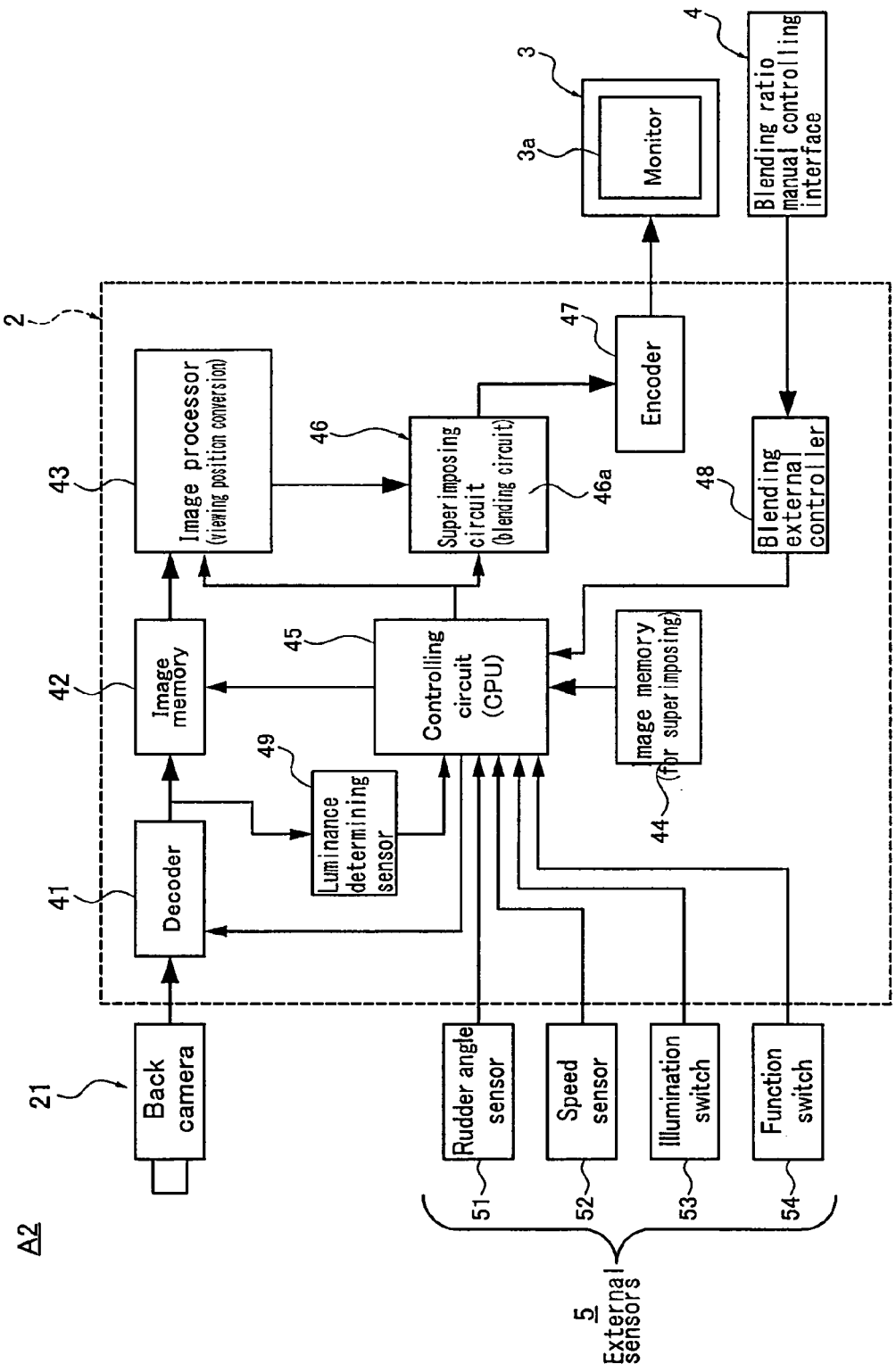
FIG. 9 is an entire system block diagram showing the back view monitor system A2 of the second embodiment (an example of the vehicle-peripheral image displaying system).

FIG. 9 is an entire system block diagram showing the back view monitor system A2 of the second embodiment (an example of the vehicle-peripheral image displaying system).

The back view monitor system A2 of the second embodiment, as shown in FIG. 9, includes the back camera 21 (the vehicle-mounted external camera), the image processing controlling unit 2 (monitor-image producing unit), the monitor 3, the blending ratio manual controlling interface 4, and the external sensor 5.

The image processing controlling unit 2, as shown in FIG. 9, includes the decoder 41, the image memory 42, the image processor 43, the image memory 44 (the image storing memory), the controlling circuit (CPU) 45, the superimposing circuit 46 (the image composition circuit), the encoder 47, the blending external controller 48, and the luminance determining sensor 49 (the luminance detector).

The external sensor 5 includes, as shown in FIG. 9, the rudder angle sensor 51, the speed sensor 52, the illumination switch 53 (the lighting condition detector), the function switch 54, and the other sensor, switch or the like.

The back camera 21 is provided to be mounted inside or near a trunk lid and a license plate in the case of a passenger car, and provided around an upper end of the back window in the case of a large car such as a recreational vehicle. The back camera 21 takes an image of the back of the vehicle which is the blind area from the driver.

The back camera 21 obtains data of the actually shot camera image of the back part of the vehicle by the image sensor (CCD, CMOS or the like).

In the present back view monitor system, the camera is positioned such that the vicinity of a bumper comes out in the image to be displayed so that the vehicle sense is to be obtained by getting a clue from the displayed vicinity of the bumper and a trajectory line.

In the second embodiment, the vehicle sense is to be achieved, in the same way as the side view monitor system described in the first embodiment, by superimposing the vehicle interior image which is previously shot toward the back of the vehicle interior from the driver's eye position.

The other structure is in the same way as FIG. 1 of the first embodiment and an explanation is abbreviated with having the same numbers placed on the corresponding structure.

Next, the function is described.

Figure 10:
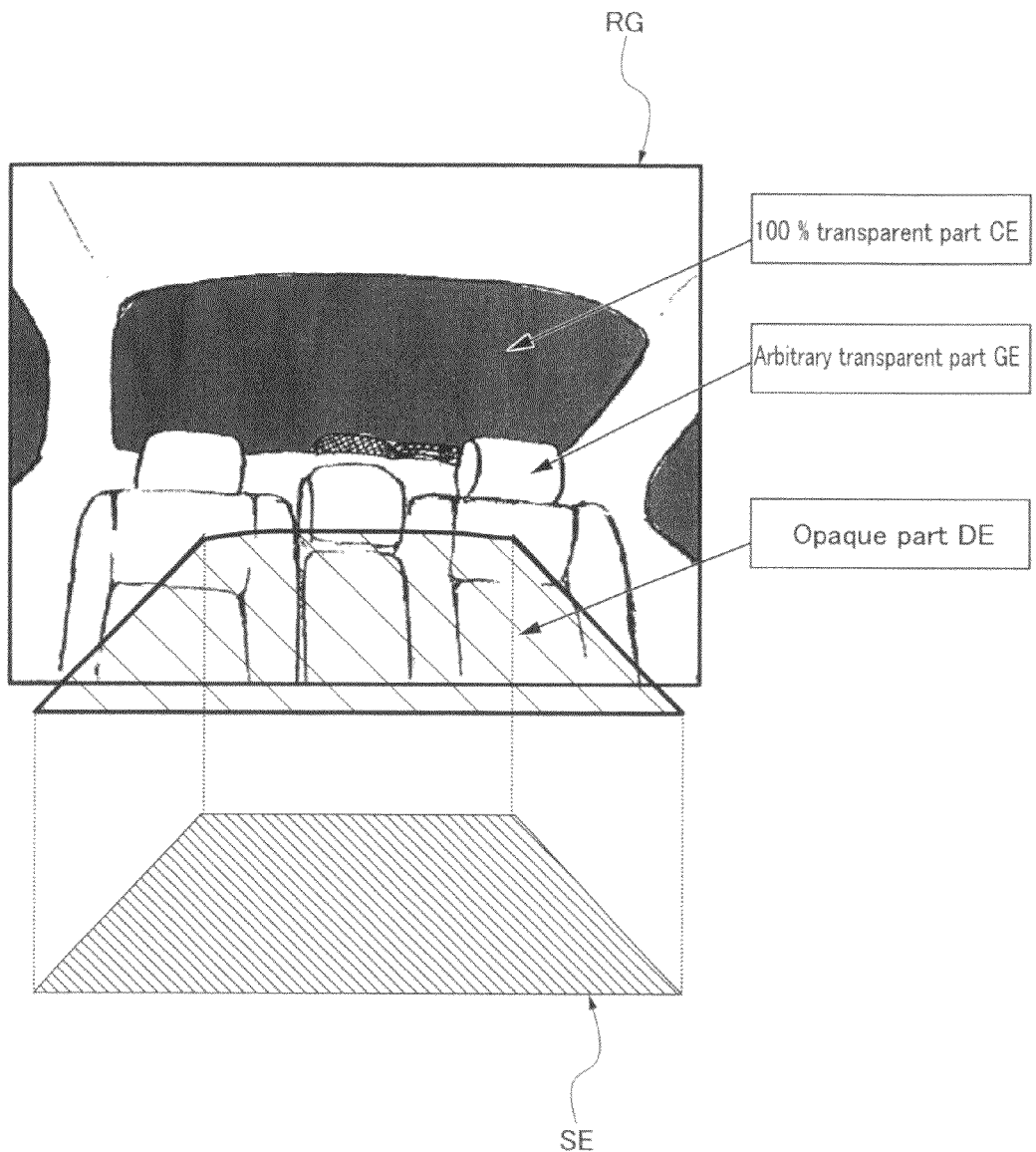
FIG. 10 shows the translucent vehicle interior image RG in which in the back view monitor system A2 of the second embodiment "the opaque part DE", "the 100% transparent part CE" and "the arbitrary transparent part GE" are combined with the vehicle interior image RP of the backside.

FIG. 10 shows the translucent vehicle interior image RG in which in the back view monitor system A2 of the second embodiment "the opaque part DE", "the 100% transparent part CE" and "the arbitrary transparent part GE" are combined with the vehicle interior image RP of the backside.

The back view monitor system A2 of the second embodiment has a form in which the side camera 1 of the side view monitor system A1 of the first embodiment using the side camera 1 is displaced to the back camera 21.

As is the case in the side camera 1 as described above, the actually shot camera image from the back camera 21 is converted into the image in digital, and the viewpoint conversion is performed to form the virtual camera image of the driver's eye position.

On the virtual camera image, the projected vehicle image as FIG. 4 is taken toward the back side of the vehicle this time, and the projected area of the vehicle is adapted to the vehicle interior image which superimposes with the virtual camera image of the back camera 21.

When the vehicle interior image viewed from the driver's eye position is superimposed, as shown in FIG. 10, a hatched line area, which is corresponding to the shadow SE in which the vehicle is vertically projected, is set as "the opaque part DE" having the transmissivity of 0%, and likewise the window glass area is set as "the transparent part CE" having the transmissivity of 100%.

Further the other area is set as the translucent "arbitrary transparent area GE" on which an alpha blend operation is performed at the arbitrary transmissivity. The transmissivity is capable of being set by the user.

Therefore, the fact that the image expressed in the back view monitor system A2 is the image which is viewed transparently through the backside of the vehicle can be straightforwardly expressed.

Further, since the other functions are the same as the first embodiment, the explanation is abbreviated.

Next, the advantageous effects will be described.

In the back view monitor system A2 of the second embodiment, the following effects can be achieved in addition to the effects of (1) to (7) of the first embodiment (9) The vehicle-mounted external camera is the back camera 21 used for the back view monitor system A2. The back view monitor system A2 displays the back part, which is the blind area from the driver, of the vehicle on the vehicle interior monitor 3.

Therefore, for example, the vehicle stop line which is necessary when driving backward at parking, a vehicle stop curbstone, a positional sense or a distant sense of between the vehicle and a wall or the like, or a positional sense and a distant sense between the vehicle and the approaching following vehicle while running can be intuitively recognized so that the contributive level to the safe driving or a quick parking can be made larger.

THIRD EMBODIMENT

The third embodiment is an example of a front view monitor system configured to display a vehicle's front part, which is the blind area from the driver, on the vehicle interior monitor by using a front camera provided at the vehicle's foreside position for eliminating the blind area as the vehicle-mounted external camera.

First, the structure is described.

Figure 11:
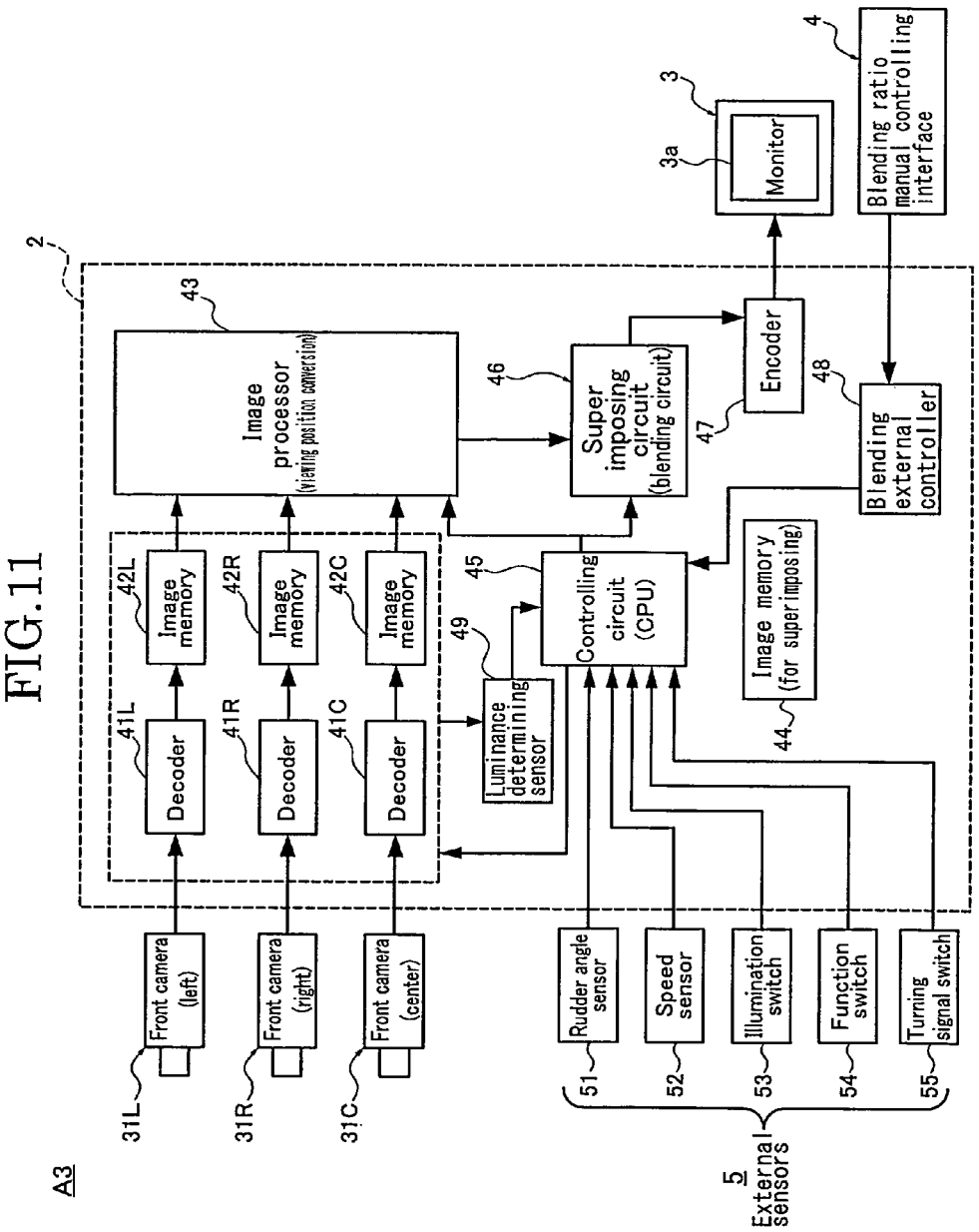
FIG. 11 is an entire system block diagram which shows the front view monitor system A3 of the third embodiment (an example of the vehicle-peripheral image displaying system).

FIG. 11 is an entire system block diagram which shows the front view monitor system A3 of the third embodiment (an example of the vehicle-peripheral image displaying system).

The front view monitor system A3 of the third embodiment, as shown in FIG. 11, includes a left front camera 31L (the vehicle-mounted external camera), a right front camera 31R (the vehicle-mounted external camera), a center front camera 31C (the vehicle-mounted external camera), the image processing controlling unit 2 (monitor-image producing unit), the monitor 3, the blending ratio manual controlling interface 4, and the external sensor 5.

The image processing controlling unit 2, as shown in FIG. 11, includes a left decoder 41L, a right decoder 41R, a center decoder 41C, a left image memory 42L, a right image memory 42R, a center image memory 42C, the image processor 43, the image memory 44 (the image preserving memory), the controlling circuit (CPU) 45, the superimposing circuit 46 (the image composition circuit), the encoder 47, the blending external controller 48, and the luminance determining sensor 49 (the luminance detector).

The external sensor 5, as shown in FIG. 11, includes the rudder angle sensor 51, the speed sensor 52, then illumination switch 53 (the lighting condition detector), the function switch 54, a turning signal switch 55, and the other sensor, switch or the like.

The front view monitor system includes a number of cameras in many cases of the existing systems, and also may include three cameras of left, right, and center.

Therefore, as an example of the front view monitor system A3 of the third embodiment, the case which uses the three cameras of the left front camera 31L, the right front camera 31R, and the center front camera 31C is cited.

In the same way as the side camera 1 of the first embodiment, after the image processing of the digital conversion and the viewpoint conversion, the superimposing image, that is, the vehicle interior image on which the vertically projected shadow of the vehicle form is added is superimposed on the images output from each of the front camera 31L, 31R, and 31C so that the composite image is obtained.

In the third embodiment, since the imaging area is divided into 3 by the three front cameras 31L, 31R, and 31C, the transmissivity of "the arbitrary transparent part GE" of the imaging area divided into 3 is automatically adjusted in conjunction with the turning signal switch 55 in which a switch signal is output when a course is changed by turning a steering wheel to either left or right at the slow driving or after stopping.

Figure 12:
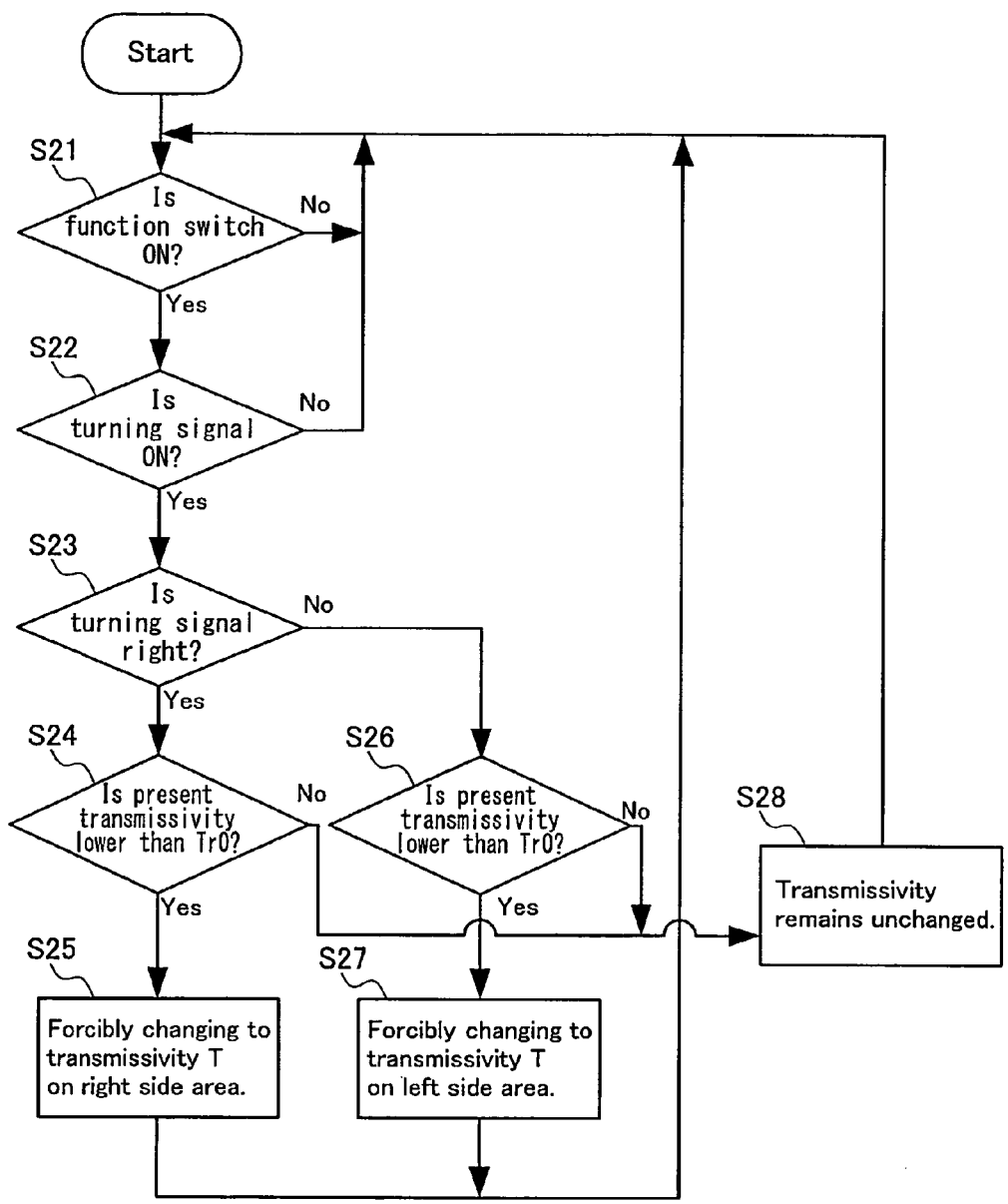
FIG. 12 is a flow chart which shows a flow of blending ratio sensor conjunction controlling processing operated in the controlling circuit 45 in the front view monitor system A3 of the third embodiment.

FIG. 12 is a flow chart which shows a flow of blending ratio sensor conjunction controlling processing operated in the controlling circuit 45 in the front view monitor system A3 of the third embodiment. Hereinafter, each of the steps will be described (an example of a blending ratio sensor conjunction adjuster).

Here, a case in which the user changes the blending ratio of the left and right at an arbitrary setting and sets the current transmissivity Tr1 to, for example, a value such as 30% is assumed.

At a step S21, whether the function switch 54 is ON or not is judged, if Yes, the process moves onto a step S22, if No, the judgment at the step S21 is repeated.

At the step S22, following the judgment at the step S21 that the function switch 54 is ON, whether ON signal from the turning signal switch 55 is being output (whether the turning signal is blinking) or not is judged, if Yes, the process moves onto a step S23, if No, returns to the step S21.

At the step S23, following the judgment at the step S22 that the ON signal is being output from the turning signal switch 55, whether the signal from the turning signal switch 55 is a course changing signal to the right or not is judged, if Yes (the turning signal is the signal to the right), the process moves onto the step S24, if No (the turning signal is left), moves onto a step S26.

At the step S24, following the judgment at the step S23 that the turning signal is to the right, whether the current transmissivity Tr1 is lower than the set value Tr0 or not is judged, if Yes (Tr1<Tr0), the process moves onto a step S25, if No (Tr1≥Tr0), moves onto a step S28.

Here, the set value Tr0 is a transmissivity threshold for securing a range of view to the right which is the course direction to be changed.

At the step S25, following the judgment at the step S24 that Tr1<Tr0, the transmissivity of an imaging area of the right front camera is forcibly changed from the current transmissivity Tr1 to a transmissivity T (for example, Tr0) and the process returns to the step S21.

At the step S26, following the judgment at the step S23 that the turning signal is to the left, whether the current transmissivity Tr1 is lower than the set value Tr0 or not is judged, if Yes (Tr1<Tr0), the process moves onto a step S27, if No (Tr1≥Tr0), moves onto the step S28.

Here, the set value Tr0 is the transmissivity threshold for securing a range of view to the left which is the course direction to be changed.

At the step S27, following the judgment at the step S26 that Tr1<Tr0, the transmissivity of an imaging area of the left front camera is forcibly changed from the current transmissivity Tr1 to a transmissivity T (for example, Tr0) and the process returns to the step S21.

At the step S28, following the judgment at the step S24 or the step S26 that Tr1≥Tr0, the current transmissivity Tr1 is kept unchanged and the process returns to the step S21.

The other structure is in the same way as FIG. 1 of the first embodiment and an explanation is abbreviated with having the same numbers placed on the corresponding structures.

Next the function is described.

Figure 13:
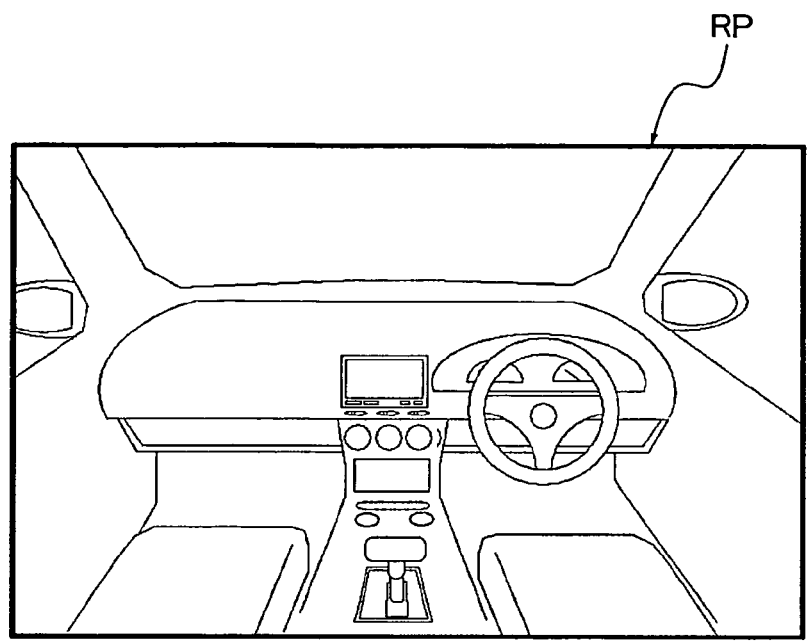
FIG. 13 shows a vehicle interior image being previously shot toward foreside from the driver's eye position.

FIG. 13 shows a vehicle interior image which is previously shot toward foreside from the driver's eye position.

Figure 14:
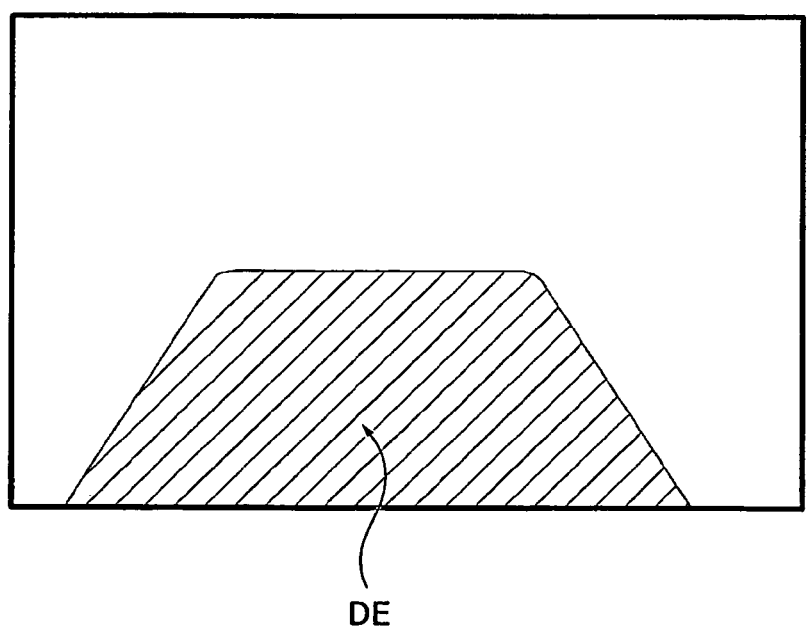
FIG. 14 shows the image (the opaque part) when the image, in which the vehicle form is vertically projected on the road surface from the vehicle on which the front view monitor system A3 of the third embodiment is mounted, is transparently viewed through from the driver's eye position.

FIG. 14 shows the image (the opaque part) when the image, in which the vehicle form is vertically projected on the road surface from the vehicle on which the front view monitor system A3 of the third embodiment is mounted, is transparently viewed through from the driver's eye position.

Figure 15:
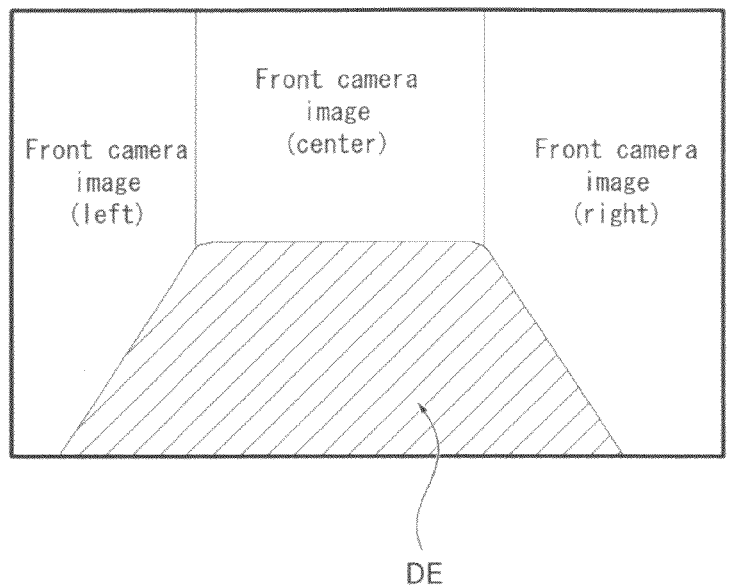
FIG. 15, in the front view monitor system A3 of the third embodiment, shows a composite image in which the divided areas of the left, right, and center front camera images and "the opaque part DE" of FIG. 14 are combined.

FIG. 15, in the front view monitor system A3 of the third embodiment, shows a composite image in which the divided areas of the left, right, and center front camera images and "the opaque part DE" of FIG. 14 are combined.

Figure 16:
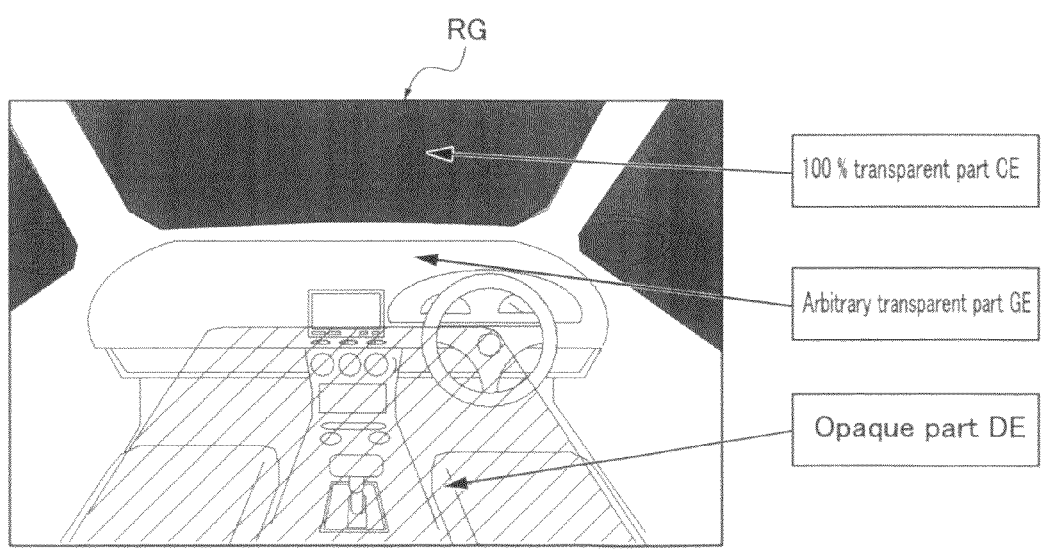
FIG. 16 shows a translucent vehicle interior image RG in which "the opaque part DE", "the 100% transparent part CE" and "the arbitrary transparent part GE" are combined with the vehicle interior image RP shown in FIG. 13 in the front view monitor system A3 of the third embodiment.

FIG. 16 shows a translucent vehicle interior image RG in which "the opaque part DE", "the 100% transparent part CE" and "the arbitrary transparent part GE" are combined with the vehicle interior image RP shown in FIG. 13 in the front view monitor system A3 of the third embodiment.

On the vehicle interior image RP, which is previously shot toward foreside from the driver's eye position and shown in FIG. 13, the area in which the vehicle form is vertically projected on the road surface as shown in FIG. 14 is made into "the opaque part DE" having the transmissivity of 0%.

Then, a wide-angle screen image having more than 180-degree is to be displayed on the area which excludes "the opaque part DE" from the vehicle interior image RP.

When the wide-angle screen image having more than 180-degree is converted into the image on which the viewpoint conversion is performed to be viewed from the driver's eye position, as shown in FIG. 15, the screen image is composed such that the camera image from the center front camera 31C on the center area, the camera image of the left front camera 31L on the left area, and the camera image of the right front camera 31R on the right area are combined.

That is, on the image using the cameras, because of the structure for securing the range of view, the camera images of the left, right, and center front cameras 31L, 31R, and 31C are often displayed in one screen image.

In this case, usually each of the camera images is combined so that the wide-angle screen image having more than 180-degree is to be displayed.

The images of FIG. 13 and FIG. 14 are superimposed on the image of FIG. 15 and the blending ratio of the vehicle interior image RP of FIG. 13 is differentiated as "the opaque part DE", "the 100% transparent part CE", and "the arbitrary transparent part GE". As a result, as shown in FIG. 16, the image in which the outside of the vehicle foreside is viewed transparently through the vehicle interior is offered to the driver.

Therefore, in the case of the front view monitor system A3 of the third embodiment, in the same way as the image of the previously described side view monitor system A1 or the back view monitor system A2, along with eliminating the blind area, the image in which the vehicle sense, that is, the form and the dimensions of the vehicle are clearly seen at a glance and are intuitively recognized at the avoidance of a sudden possibility can be offered.

[Transmissivity Automatic Adjusting Function by Turning Signal Conjunction]

The turning signal switch 55 corresponds when a steering wheel is turned, that is, when the course is changed either to the left or right after a slow driving or stopping.

In this case, the information of the approaching vehicle from left and right is more important than the view of the central part.

In response, in the third embodiment, if the right turning signal is detected and if the current transimissivity Tr1 is lower than the set value Tr0, in the flow chart of FIG. 12, the process moves onto the step S21, step S22, step S23, step S24, and then to step S25.

At the step S25, since the view of the right side area is more important than the central area of the screen image, in order to secure the view, the system performs the alpha blend operation which automatically heightens the transmissivity.

Further, if the left turning signal is detected and if the current transmissivity Tr1 is lower than the set value Tr0, in the flow char of FIG. 12, the process moves onto the step S21, step S22, step S23, step S26, and then step S27.

At the step S27, since the view of the left side area is more important than the central area of the screen image, in order to secure the view, the system performs the alpha blend operation which automatically heightens the transmissivity.

Therefore, when the course is changed to the right, the right side view is more vividly secured. When the course is changed to the left, the left side view is more vividly secured.

As a result, the information of the approaching vehicle from the side to which the course is changed can be accurately recognized.

Here, while the above-described operation is running, the transmissivity may be set to be changed by weighting only on either one after distinguishing the turning signal being left or right.

Since the other functions are the same as the first embodiment, the explanation is abbreviated.

Next, the advantageous effects will be described.

In the front view monitor system A3 of the third embodiment, in addition to the effects of (1) to (7) of the first embodiment, the following effects can be achieved.

(10) The vehicle-mounted external camera is each of the left, right, and center front cameras 31L, 31R, and 31C used in the front view monitor system A3 configured to display the foreside portions, which is the blind area from the driver, of the vehicle on the vehicle interior monitor 3.

Therefore, for example, the positional sense and the distant sense, which are needed when the vehicle is starting straight or starting whilst circling from a state of stopping or slow driving, of between the vehicle and the obstacle or the like of the vehicle's foreside or the positional sense and the distant sense of between the vehicle and the approaching vehicle are intuitively recognized so that the contributive level to the safe driving can be made larger.

Hereinbefore, the vehicle-peripheral image displaying system of the present invention has been described in terms of the first to the third embodiments. However, regarding the concrete structure, it is not limited to the embodiments. And design changes, additions or the like are allowed as long as it does not depart from the scope of the present invention as defined by each of the following claims.

In the first to third embodiments, as the translucent vehicle interior image which superimposes on the virtual camera image, the case in which the previously prepared vehicle interior image RP is distinguished as "the opaque part DE", "the 100% transparent part CE", and "the arbitrary transparent part GE" and additionally the case in which the border frame is displayed on "the opaque part DE" were exemplified.

However, as substitute for "the opaque part DE", "the opaque part DE" may be exemplified with a painted "shadow part".

Also, the vehicle interior image RP which is previously prepared may be distinguished as "the opaque part DE" or "the shadow part" and "the arbitrary transparent part GE".

Further, the vehicle interior image RP which is previously prepared may be distinguished as "the opaque part DE" or "the shadow part" and "the transparent part whose transmissivity is gradationally changed".

INDUSTRIAL APPLICABILITY

The first embodiment has described the example of the side view monitor system A1 which uses the side camera as the vehicle-peripheral image displaying system.

The second embodiment has described the example of the back view monitor system A2 which uses the back camera as the vehicle-peripheral image displaying system.

The third embodiment has described the example of the front view monitor system A3 which uses the front cameras as the vehicle-peripheral image displaying system.

However, as a vehicle-peripheral image displaying system, the vehicle-peripheral image displaying system can be applied to a monitor system in which the monitor is shared and one of the side, back or front views or the like can be chosen to be viewed, or to a monitor system in which the views are automatically switched over under a certain condition.

The invention claimed is:

1. A vehicle-peripheral image displaying system comprising:
a vehicle-mounted external camera mounted on a vehicle and configured to shoot an image of a vehicle-periphery;
a monitor provided in a vehicle interior at a position to cause the monitor to be visible for a driver; and
a monitor-image producing unit configured to produce an image to be displayed on the monitor based on an actually shot camera image input from the vehicle-mounted external camera, wherein:
the monitor-image producing unit includes:
an image processor configured to perform a viewpoint conversion of the actually shot camera image input from the vehicle-mounted external camera into a virtual camera image which is to be converted as if it is viewed from the driver's eye position;
an image memory configured to store a vehicle interior image, being previously shot from the driver's eye position, as a vehicle interior image; and
an image composition circuit configured:
to make the vehicle interior image output from the image memory translucent to form a translucent vehicle interior image,
to perform an image composition such that the translucent vehicle interior image is superimposed on the virtual camera image output from the image processor,
to produce a composite image representing the virtual camera image transparently through the translucent vehicle interior image,
wherein:
the image composition circuit displays, of an entire area of the vehicle interior image being previously shot from the driver's eye position, an area in which dimensions and a form of the vehicle are vertically projected on a road surface as a shadow, and
the image composition circuit includes a blending circuit configured to set, of the vehicle interior image, the shadow area in which the vehicle is projected on the road surface as an opaque part having a transmissivity of 0% of the vehicle interior image, and set an area corresponding to a window glass of the vehicle as a transparent part having a transmissivity of 100% of the vehicle interior image, also set areas other than the shadow and the window glass as a translucent part having an arbitrary transmissivity.

2. The vehicle-peripheral image displaying system according to claim 1, wherein
the blending circuit sets a border frame to be displayed on an outer circumference of the opaque part having the transmissivity of 0% of the vehicle interior image.

3. The vehicle-peripheral image displaying system according to claim 1, wherein
the blending circuit includes a blending ratio manual adjuster configured to arbitrarily adjust by a manual operation the transmissivity of the translucent part set on the vehicle interior image.

4. The vehicle-peripheral image displaying system according to claim 1, wherein
the blending circuit includes a blending ratio sensor conjunction adjuster configured to automatically adjust the transmissivity of the translucent part set on the vehicle interior image based on vehicle information and external environmental information obtained by an external sensor so as to enhance visibility of the composite image displayed on the monitor.

5. The vehicle-peripheral image displaying system according to claim 1 further comprising:
a lighting condition detector configured to detect lighting/light-out of an illumination lamp in the vehicle interior; and
a luminance detector configured to detect a luminance of the actually shot camera image input from the vehicle-mounted external camera, wherein
the image composition circuit includes a composite image luminance controller configured to invert the luminance of the composite image along with displaying a line with a white line instead of a black line when both of conditions where the illumination lamp is lighting and where a detected luminance value is lower than a set value are met.

6. The vehicle-peripheral image displaying system according to claim 1, wherein
the vehicle-mounted external camera is a side camera used for a side view monitoring system configured to display on the vehicle interior monitor a front lateral part, being a blind area from the driver, of the vehicle.

7. The vehicle-peripheral image displaying system according to claim 1, wherein
the vehicle-mounted external camera is a back camera used for a back view monitoring system configured to display on the vehicle interior monitor a back part, being a blind area from the driver, of the vehicle.

8. The vehicle-peripheral image displaying system according to claim 1, wherein
the vehicle-mounted external camera is one or more front cameras used for a front view monitoring system configured to display on the vehicle interior monitor a front part, being a blind area from the driver, of the vehicle.

9. The vehicle-peripheral image displaying system according to claim 2, wherein
the blending circuit includes a blending ratio manual adjuster configured to arbitrarily adjust by a manual operation the transmissivity of the translucent part set on the vehicle interior image.

10. The vehicle-peripheral image displaying system according to claim 2, wherein
the blending circuit includes a blending ratio sensor conjunction adjuster configured to automatically adjust the transmissivity of the translucent part set on the vehicle interior image based on vehicle information and external environmental information obtained by an external sensor so as to enhance visibility of the composite image displayed on the monitor.

* * * * *